United States Patent [19]
Clare et al.

[11] Patent Number: 5,511,826
[45] Date of Patent: Apr. 30, 1996

[54] TOWABLE NONCONDUCTIVE PIPE ADAPTER FOR A SPRINKLER HAVING LATERALLY EXTENDING SURFACES

[75] Inventors: James Clare, Escalon, Calif.; John Himmelberger, Chester Springs, Pa.

[73] Assignee: CertainTeed Corporation, Valley Forge, Pa.; a part interest

[21] Appl. No.: 333,906

[22] Filed: Nov. 3, 1994

Related U.S. Application Data

[63] Continuation-in-part of Ser. No. 254,348, Jun. 6, 1994.

[51] Int. Cl.⁶ .................................................. F16L 37/088
[52] U.S. Cl. .............................. 285/5; 285/305; 285/337; 285/415; 285/321; 285/61
[58] Field of Search .................................. 285/321, 415, 285/337, 305, 5, 61

[56] References Cited

U.S. PATENT DOCUMENTS

| | | | |
|---|---|---|---|
| 2,643,138 | 6/1953 | Jacobs et al. | 285/5 |
| 3,735,928 | 5/1973 | Watts et al. | 285/5 |
| 3,759,553 | 9/1973 | Carter | 285/305 |
| 4,092,036 | 5/1978 | Sato et al. | 285/337 |
| 4,135,738 | 1/1979 | Clements | 285/5 |
| 4,314,717 | 2/1982 | Bjurman | 285/5 |
| 4,610,471 | 9/1986 | Halen et al. | 285/337 |
| 4,627,774 | 12/1986 | Bradley | 411/5 |
| 4,779,900 | 10/1988 | Shumard | 285/114 |
| 4,878,698 | 11/1989 | Gilchrist | 285/342 |
| 4,896,903 | 1/1990 | Shumard | 285/337 |
| 5,071,175 | 12/1991 | Kennedy, Jr. | 285/337 |
| 5,255,945 | 10/1993 | Toon | 285/305 |

FOREIGN PATENT DOCUMENTS

| 671103 | 9/1963 | Canada | 285/321 |
|---|---|---|---|

OTHER PUBLICATIONS

Alcoa Trade Literature entitled "Change for the Better With Alcoa Aluminum", Jan. 1, 1994.
Pacific Northwest Cooperative Extension Publication entitled "Sprinkler Irrigation", Mar. 1965.

*Primary Examiner*—Eric K. Nicholson
*Attorney, Agent, or Firm*—Duane, Morris & Heckscher

[57] ABSTRACT

Mechanically locking sprinkler fittings are provided by this invention for making a fluid connection between irrigation pipes. The sprinkler fittings contain a tubular fitting member having first and second open ends for mating with a pair of irrigation pipes. The tubular fitting member contains a laterally facing orifice for receiving a sprinkler riser and an annular recess located along its surface which corresponds with a mating annular recess on at least a first of the irrigation pipes to form an annular cavity. The fitting also includes a flexible spline inserted into the annular cavity to form a mechanical lock between the first pipe and the tubular fitting member. The sprinkler fittings of this invention are convenient to use, and can be made of lightweight polymeric materials.

19 Claims, 8 Drawing Sheets

TOWABLE NONCONDUCTIVE PIPE ADAPTER FOR A SPRINKLER HAVING LATERALLY EXTENDING SURFACES

CROSS REFERENCE TO RELATED APPLICATION

This application is a continuation-in-part application of U.S. application Ser. No. 08/254,348, filed on Jun. 6, 1994.

FIELD OF THE INVENTION

This invention relates to devices for coupling axially aligned piping together, and more particularly, to adapters for coupling fluid transport piping for irrigation needs.

BACKGROUND OF THE INVENTION

Sprinkler irrigation has over the years replaced many other forms of irrigation methods because it minimizes erosion, prevents many drainage problems, does not require land leveling, and provides light applications of moisture for "irrigating up" crops.

Whenever a sprinkler system is referred to by name, the reference is usually made to the manufacturer's brand name. Sprinkler systems are typically classified by the degree of their portability. For example, a fully portable system can be moved from one field to another, a semi-portable system is similar but the pumping plant is in a fixed location. There are also semi-permanent, fully permanent and hand-moved systems.

A number of manufacturers currently provide fittings for sprinkler systems. These fittings included couplers, ells, Tees, reducers, Tee-type valves for maintaining hydrants, and valve-opener elbows. Such fittings typically appear every 20 to 40 feet along portable sprinkler laterals and, therefore, are the fittings by which you can recognize the make of a system easily.

In some respects, the couplers, as well as other fittings, are much alike. All have either one or two replaceable rubber gaskets to prevent the loss of water between the pipe and the coupler when pressure is applied. Nearly all of these gaskets are made to permit water to drain out whenever the line is shut off and the pressure is released.

There are some differences in the way the couplers of different manufactures fasten to a pipe. Some have a latch on both ends, others are bolted or welded to the pipe on one end and still others have one end rolled or pressed into the pipe. On most systems, the coupler makes a flexible joint which allows the sprinkler pipe to bend or form an angle. Some flexibility is desirable, particularly on rolling land.

Most couplers also have a guide or guard apron that helps to keep dirt from being scooped up when the pipe is inserted, or moved.

Current use of aluminum pipe couplers for sprinkler lines has settled out to 3 popular styles, the "drop lock" or "no-latch" style and the "tow line" or "drag line" style. These fittings are fitted with one of two styles of Chevron gaskets: a "drain" gasket which at a drop in pressure is designed to leak water through the coupler and a "non drain" gasket which leaks water at a substantially lower pressure. The locking mechanism for the three styles is a latch or band bolted or welded to the opposite (or male) end of a piece of aluminum tubing. Sprinkler pipe fittings are cast aluminum or steel galvanized. There are several manufacturers of these fittings, the basic styles have been used from before 1970. This coupler is fitted with a ¾" or 1" Female iron pipe thread to facilitate the installation of a metal (usually steel galvanized) riser of 6–36" lengths and a sprinkler of varying sizes and manufacture.

This sprinkler-riser-coupler-aluminum tubing combination, is light in weight and is commonly referred to as "hand move" pipe, installed and removed manually, typically by three individuals. The "drag line" or "tow line" styles can be pulled by tractor or machinery but it is necessary to install manually and disassemble manually by two or more individuals. "Hand move" aluminum pipe has, in recent years, been adapted to a system generally referred to as "solid set" or in a complete grid covering an entire field. These systems are laid out and removed manually typically by two laborers and one individual driving a farm style tractor and small trailer. Installation, removal, transport and storage of these pipe-coupler-riser-sprinkler assemblies commonly referred to as "hand move" pipe is cumbersome and labor intensive. The nature and advantage of the "hand move" aspect of the pipe and fittings is a distinct disadvantage in a "solid set" situation as the system requires constant monitoring in that couplers can come apart from wind, temperature changes, line surges, pipe misalignment, faulty latches, inadvertent labor or mechanical contact, slippage, and "riser flop". The gasket, designed to leak, to accommodate rapid "hand movement" is a distinct disadvantage to water conservation and inundation of localized water around couplers (promotes disease) and requires that entire pipelines be refilled prior to pressurization leading to line surges and air entrapment, both of which affect the integrity and safety of the system. The nature, rigidity and length (30–40') of "hand move" pipe and the inherent ability of a single person to lift and manipulate the assembly has been hazardous or fatal when laborers make inadvertent contact with electrical sources such as power lines, boxes and outlets.

SUMMARY OF THE INVENTION

Mechanically locking sprinkler fittings are provided by this invention for making fluid connections between irrigation pipes typically used in the farming industry. The fittings include a tubular fitting member having first and second open ends for mating with a pair of irrigation pipes. Extending laterally through the sidewall of the tubular fitting member is an orifice for receiving a sprinkler riser. The tubular fitting member also includes at least one annular recess located along its interior or exterior surface which corresponds with a mating annular recess on at least one of the irrigation pipes to form an annular cavity when this irrigation pipe is connected with the tubular fitting member. The invention further includes at least one flexible spline which can be inserted into the annular cavity formed between the irrigation pipe and the tubular fitting member to form a mechanical lock between the first pipe and the tubular fitting member.

Accordingly, this invention provides sprinkler fittings which are simple to use and much less expensive than traditional fitting members used in irrigation. The sprinkler fittings of this invention can be reversibly disengaged simply by removing the flexible spline for quick access to the interior of the irrigation system, for example, during cleaning or emergency repair. These fittings also can minimize labor and expense during the movement of the irrigation system or the sprinkler heads, and can be engaged and disengaged without breaking apart welds or complicated fasteners. The polymer versions of this invention provide a lighter system that can be moved with less effort. Such systems also minimize the risk of electric shock, and are much easier to use.

In an alternative embodiment of this invention, a mechanically locking sprinkler fitting in combination with a pair of irrigation pipes, is provided. The pipes have at least one free, open end which contains an annular recess located along an exterior surface thereof. The sprinkler fitting includes a tubular fitting member having first and second open ends for receiving the open ends of the irrigation pipes. The tubular fitting member also has an orifice for receiving a sprinkler riser, and includes a pair of annular recesses located along its inner surface which correspond with the annular recesses located on the exterior surfaces of the irrigation pipes to form a pair of annular cavities. Upon mating the irrigation pipes to the tubular fitting member, one or more flexible splines can be inserted into the pair of annular cavities to form a pair of mechanical locks between the irrigation pipes and the tubular fitting member.

BRIEF DESCRIPTION OF THE DRAWINGS

The accompanying drawings illustrate preferred embodiments of this invention according to the practical application of the principals thereof, and in which.

DETAILED DESCRIPTION OF THE INVENTION

DISSIMILAR PIPE ADAPTER

The first embodiment of this invention provides mechanical joints between dissimilar piping materials, including pipes, valves, various pipe fittings, hydrants, and miscellaneous connections in piping systems, including sewer systems, water distribution systems, and chemical transport systems. As used herein, the term "pipe" includes all of the above connections and those that are consistent with the principals of this invention.

Figure 1:
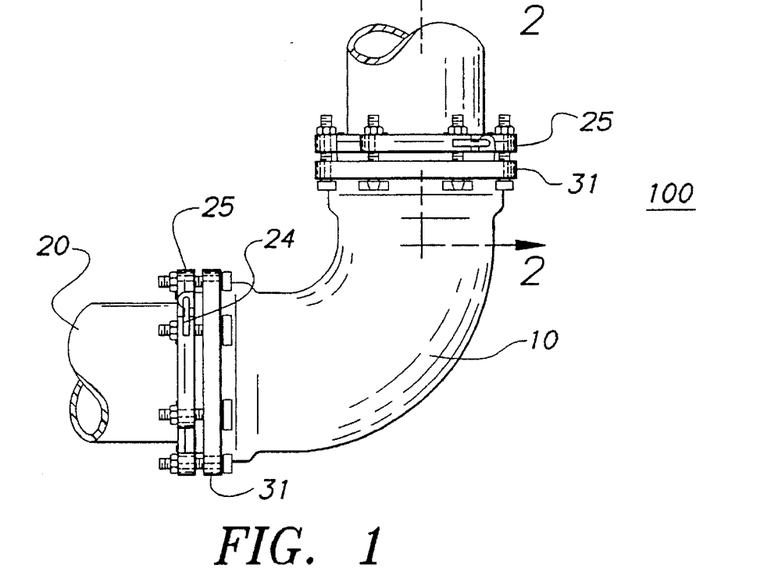
FIG. 1: is a side elevation view of a cast iron fitting mounted by a pair of mechanical joint pipe adapters to a pair of PVC pipes.
Figure 2:
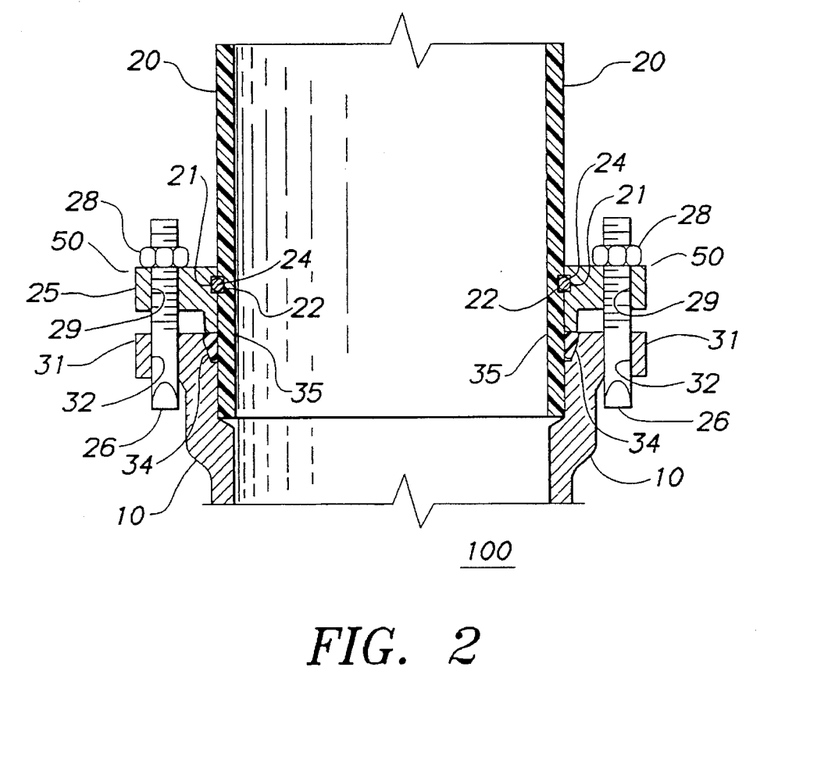
FIG. 2: is a side elevation, cross-sectional view taken through line 2—2 of FIG. 1, illustrating the mechanical locking spline and gasket features of this invention.
Figure 3:
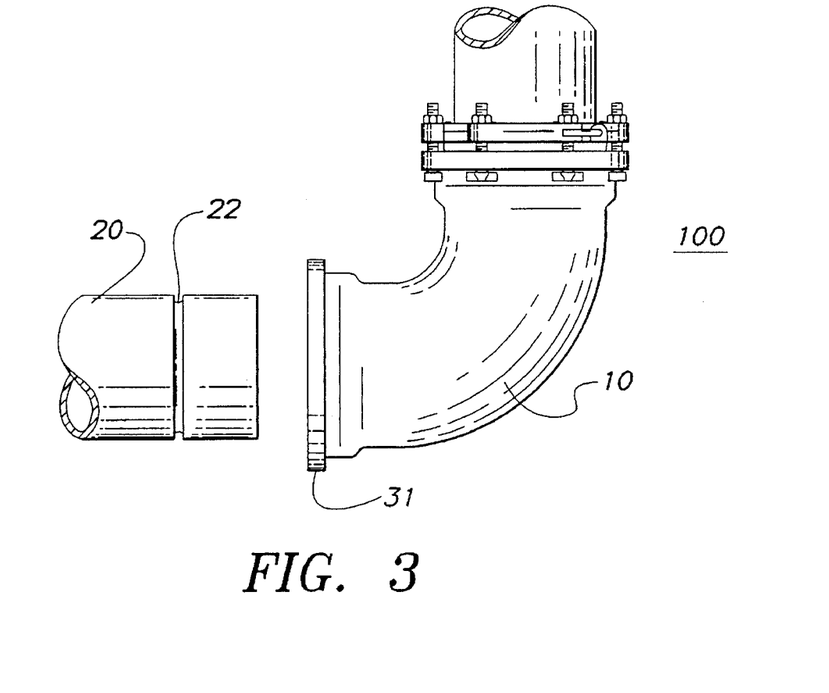
FIG. 3: is a side elevation view of a PVC pipe being prepared for joining to a cast iron fitting.

With reference to FIGS. 1 and 2, the preferred mechanical pipe connection 100 will now be described. In this connection, a metal fitting 10, typically made of ductile iron or cast iron is provided. The metal fitting 10 includes a mechanical joint end 31 equipped with fastener holes 32. Such pipes are ubiquitous throughout the United States, especially in the older, more established, cities.

Since one of the primary purposes of this invention is to provide a connection between a standard metal fitting 10 and a pipe of a different type of material, such as plastic (e.g. PVC) pipe 20, the connection between these materials should be strong enough to withstand high axial loads caused by rushing fluid through the piping system, for example, loads greater than about 150 psi.

This invention provides, in a preferred embodiment, an adapter gland 25 having an internal diameter that closely matches the external diameter of the plastic pipe 20. The adapter gland 25 can be made of a stiff polymer, such as acetal, nylon, phenolic, polycarbonate, poly(amide-imide), polyester (TP), PEEK, polyimide, polyphenylene sulfide, sulfones, mixture of these, and their fiber-filled counterparts. More preferably, the gland 25 includes a metal which is compatible with the metal fitting 10, such as cast iron or ductile iron.

The adapter gland 25 further includes an annular recess 21 located along its inner diameter. This annular recess 21 is preferably matched or at least partially overlapping with a mating annular recess 22 along the outer diameter of the plastic pipe 20. When these annular recesses 21 and 22 are aligned, an annular cavity is formed between the adapter gland 25 and the plastic pipe 20. This cavity preferably is sized to snugly receive the flexible spline 24 and can be circular, square or rectangular in cross-section. Since the relationship between the spline 24 and the formed cavity is as close as possible to a "forced fit", it is desirable that a side aperture 33 be provided through the side wall of the adapter gland 25 to insert the flexible spline 24 after the adapter gland 25 has been inserted over the plastic pipe 20.

Figure 7:
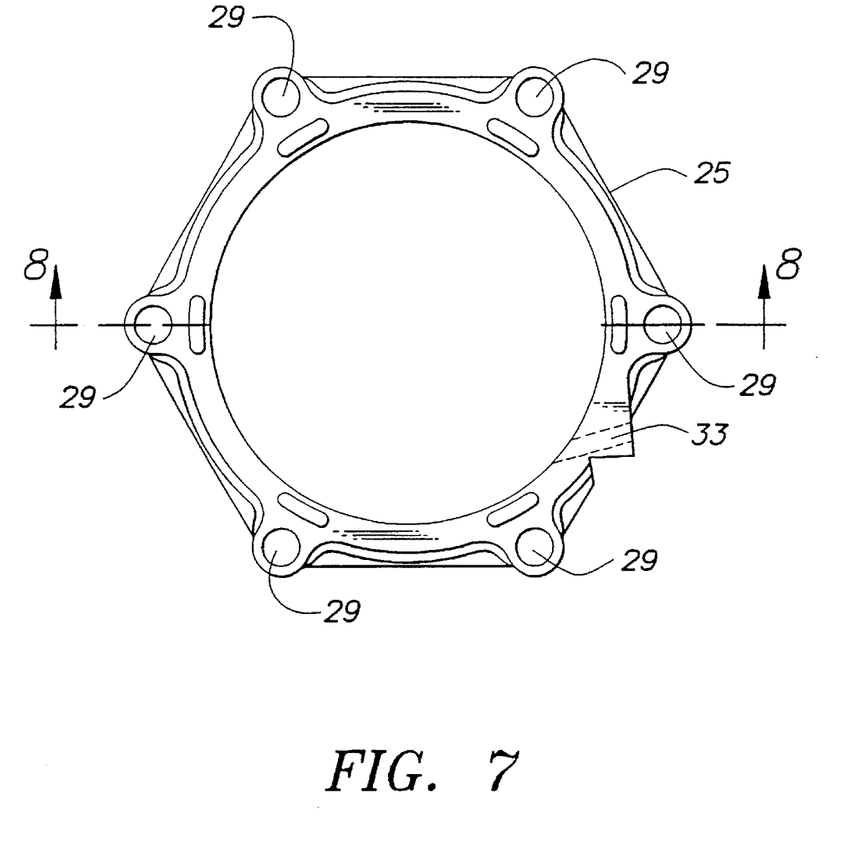
FIG. 7: is a top elevation view of a preferred gland portion of the pipe adapter of this invention.
Figure 8:
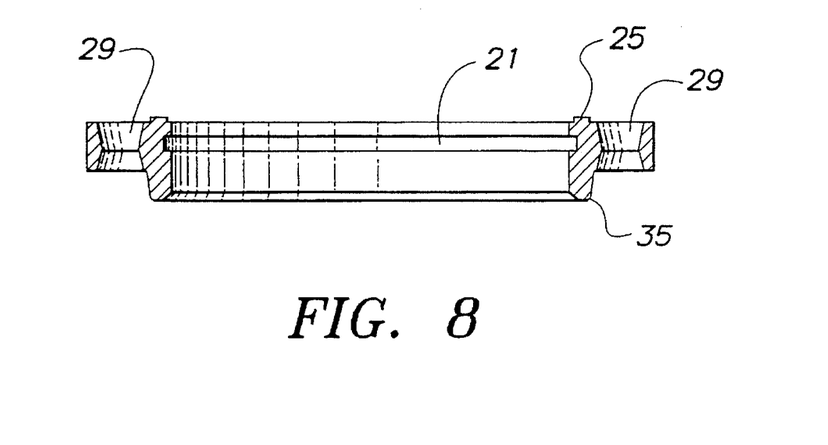
FIG. 8: is a side elevation, cross-sectional view, taken through line 8—8 of FIG. 7, illustrating the fastener holes and annular recess of the preferred gland.

With respect to FIGS. 7 and 8, the preferred adapter gland 25 will now be described in more detail. The side aperture 33 is provided through the side wall of the adapter flange almost tangentially to the annular recess 21 as shown in FIG. 7. This permits the flexible spline 24 to be threaded into the annular recess by hand at a construction site. The flexible spline 24 is preferably made of a synthetic resinous material, such as polyethylene, polypropylene, polystyrene, PVC, nylon, polyamide, and the like. Although these materials are flexible, they are designed to resist compression under the typical working pressures of most fluid piping systems. Additionally, since the flexible spline 24 is preferably not elastomeric, the resulting mechanical lock will not become unjoined unless and until the spline is removed back through the aperture 33 in the side wall. To facilitate removal, a small length of the spline 24 can be left outside of the gland 25 so that it can be grasped and removed.

Optionally, a molten or flowable polymer can be injected into the annular cavity through aperture 33 and then solidified to form a permanent mechanical lock.

Relating back to the cross-sectional depiction of FIG. 2, the mechanical pipe connection 100 can also include a resilient joint gasket 34 mounted between the metal fitting 10 and the plastic pipe 20. In a preferred embodiment, the adapter gland 25 has an axially extending lip 35 which compresses against the resilient joint gasket 34 upon final assembly.

The final connection can be provided by a plurality of threaded fasteners 26 mounted between the adapter gland 25 and the mechanical joint end 31 in a series of fastener holes 29 and 32. These fastener holes 29 and 32 are preferably aligned to accept the threaded fasteners 26 prior to securing them with nuts 28. In a preferred embodiment, a series of Tee bolts are employed for facilitated mechanical joining. Four to twelve fastener holes can be provided along the peripheral edge of the adapter gland 25 and mechanical joint end 31 to make these connections. Preferred dimensions for the various elements of the mechanical pipe connection 100 are disclosed below in Table I.

TABLE I

DIMENSIONS OF PREFERRED EMBODIMENTS

| NOMINAL PLASTIC PIPE SIZE | ADAPTOR O.D. (INCHES) | WORKING PRESSURE | NO. OF TEE BOLTS REQUIRED | TEE BOLT SIZE | APP. WEIGHT LBS. | SPLINE WIDTH (INCHES) | SPLINE LENGTH (INCHES) |
|---|---|---|---|---|---|---|---|
| 4" | 4.80 | 150 psi | 4 | ¾" × 3 ½" | 6 | ¼ round | 18 |
| 6" | 6.90 | 150 psi | 6 | ¾" × 3 ½" | 9 | ¼ round | 24 |
| 8" | 9.05 | 150 psi | 6 | ¾" × 4" | 13 | 5/16 square | 32 |
| 10" | 11.10 | 150 psi | 8 | ¾" × 4" | 15 | ⅜ square | 39 |
| 12" | 13.20 | 150 psi | 8 | ¾" × 4" | 21 | ⅜ square | 46 |

Figure 4:
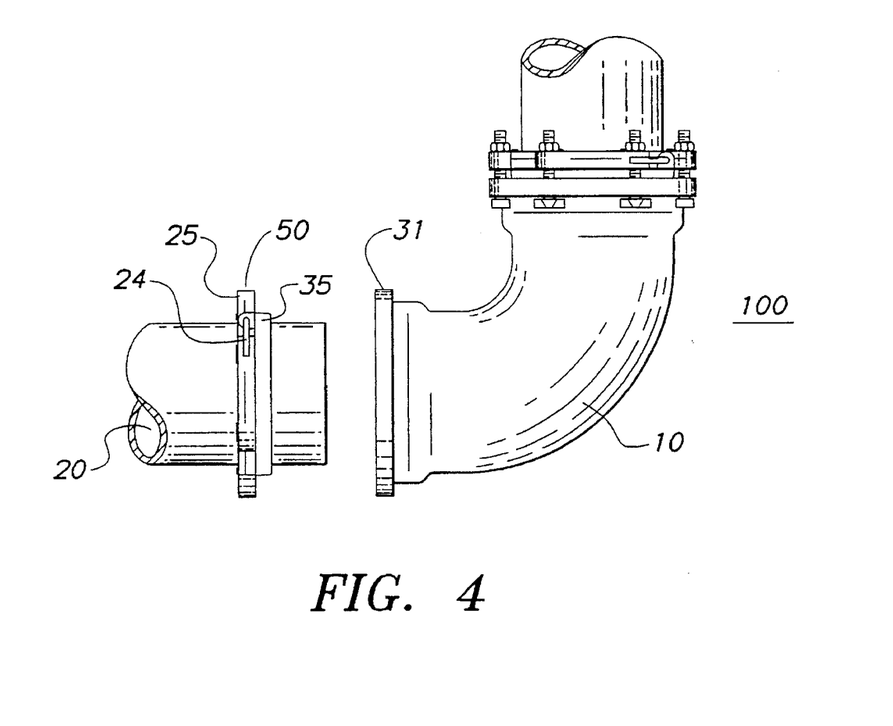
FIG. 4: is a side elevation view of a preferred pipe adapter of this invention being inserted over the PVC pipe of FIG. 3, and the preferred spline being inserted into the adapter.
Figure 5:
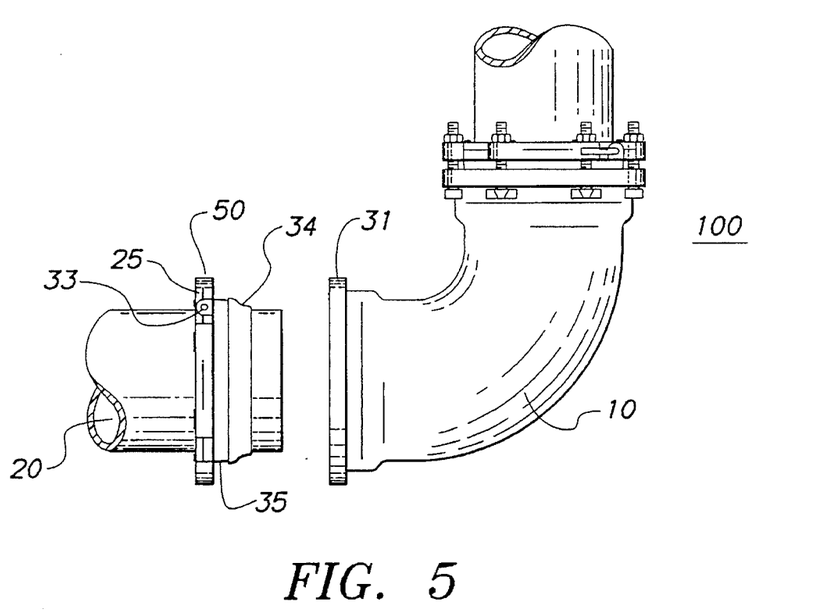
FIG. 5: is a side elevation view of the PVC pipe of FIG. 4 with its adapter and resilient gasket in place as it is inserted into the female coupling of the cast iron fitting.

This invention also provides a procedure for mechanically joining pipes and fittings, etc., made of dissimilar materials. As shown in FIGS. 3–6, the steps of this procedure will now be explained. In the first step shown in FIG. 3, the PVC pipe 20 is measured for identifying the proper location of the adapter gland 25. This measurement is used to align the annular recesses 21 and 22 located along the adapter gland 25 and the plastic pipe 20. Next, as shown in FIG. 4, the adapter gland 25 is inserted over the PVC pipe 20 with the extending lip 35 facing toward the end of the plastic pipe 20. The flexible spline 24 is then inserted through the side wall aperture 33 until it is fully seated around nearly the entire circumference of the plastic pipe 20. A spline insertion tool can be used to assist in faster installation, particularly with larger pipe sizes. When the spline 24 is inserted, it will mechanically lock the adapter gland 25 onto the plastic pipe 20. A resilient joint gasket 34, preferably made of a synthetic rubber or the like, is then lubricated and inserted over the leading edge of the PVC pipe and against the extending lip 35 of the adapter gland 25 as shown in FIG. 5. The gasket 34 ideally includes a tapered leading edge for easy insertion into the fitting socket of the metal fitting 10. With firm and uniform pressure, one can insert the leading edge of the now gland adapter-equipped PVC pipe into the female receptacle of the metal fitting 10. The joint should be kept straight during this process.

Figure 6:
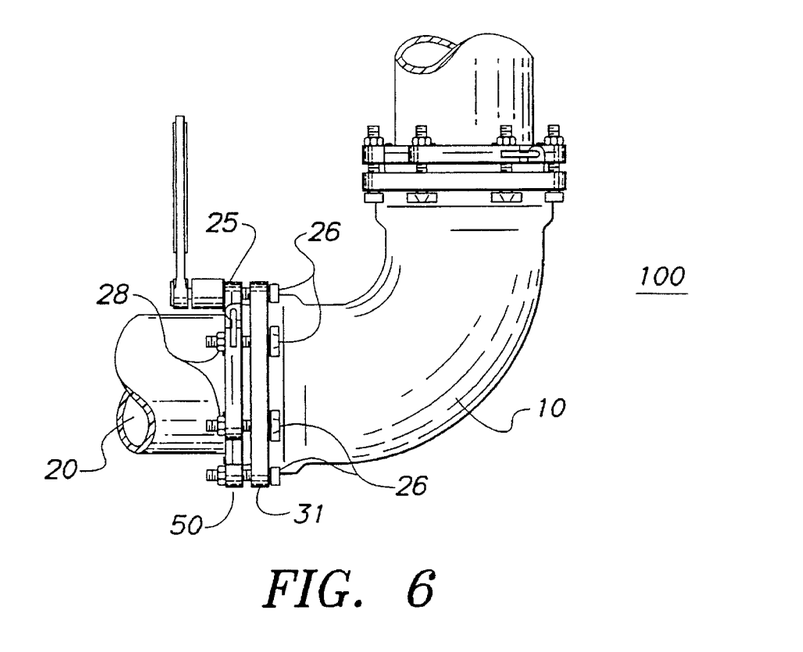
FIG. 6: is a side elevation view of the mechanical joint connection of FIG. 5, during the insertion and tightening of the fasteners.

As shown in FIG. 6, the Tee bolts are then inserted and the nuts tightened to a bolt torque of about 75–90 lbf-ft to bring the adapter gland 25 and the mechanical joint end 31 into a close relationship. The adapter gland 25 and mechanical joint end 31 need not be touching, and preferably provide a uniform gap of one quarter-one inch so that the axially extending portion 35 of the adapter flange 25 can provide a compressive force to the trailing edge of the resilient joint gasket 34, as shown in FIG. 2.

SPRINKLER FITTING

In accordance with another aspect of this invention, a mechanically locking sprinkler fitting is provided for making fluid connection between irrigation pipes, and the like. All of the materials, mechanical functions, and principles described above are incorporated by reference in relation to the mechanically locking sprinkler fitting embodiment.

Figure 9:
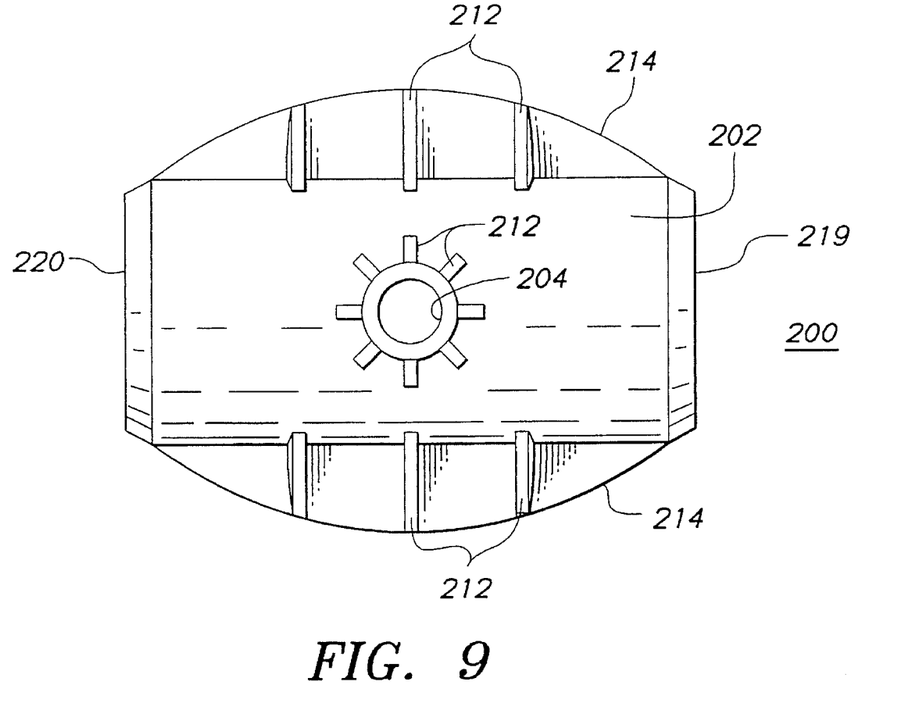
FIG. 9: is a top elevation view of a preferred sprinkler fitting of this invention.
Figure 10:
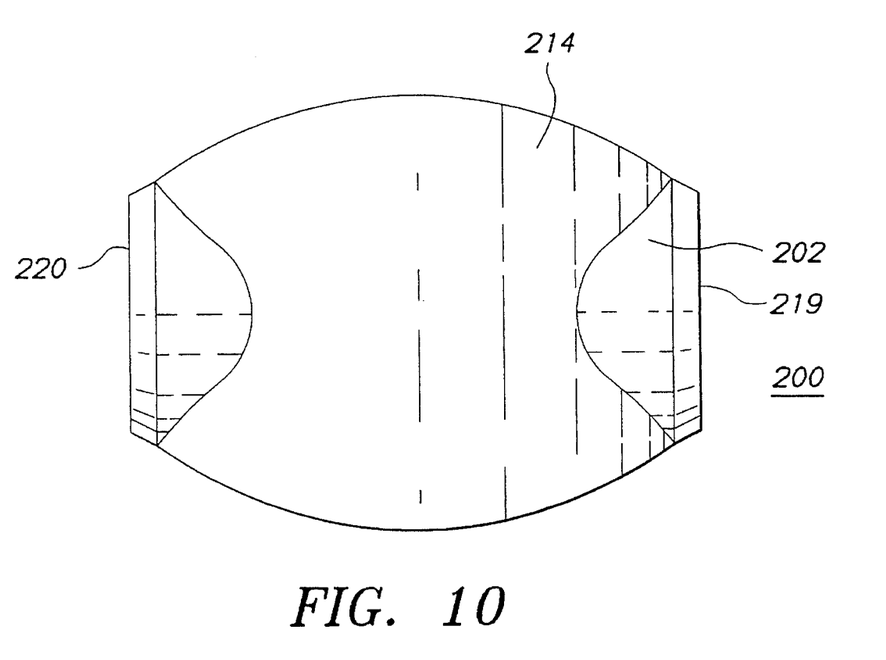
FIG. 10: is a bottom elevation view of the sprinkler fitting of FIG. 9.
Figure 11:
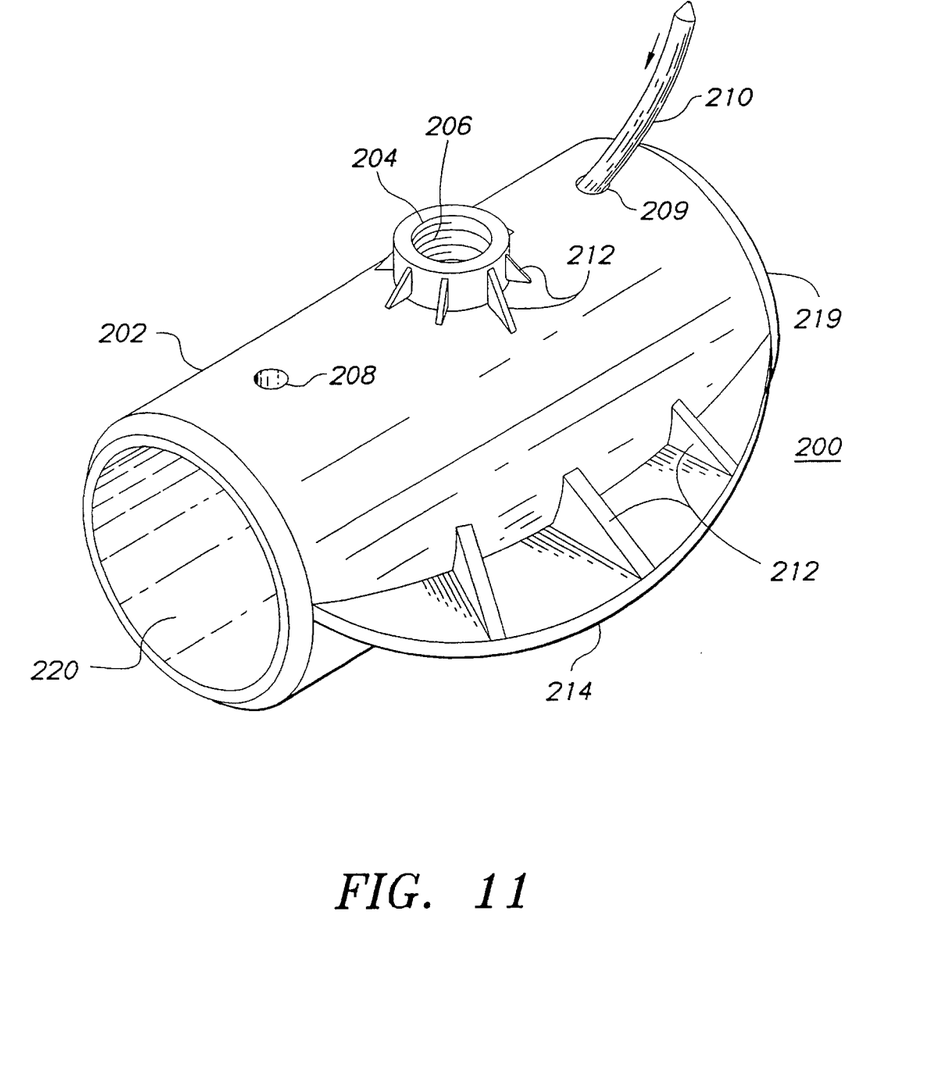
FIG. 11: is a front perspective view of the sprinkler fitting of FIG. 9.

With respect to FIGS. 9–11, there is shown a preferred sprinkler fitting 200 including a tubular fitting member 202 having first and second open ends 219 and 220. The tubular fitting member 202 is designed for mating with a pair of irrigation pipes 222 and 224 shown in FIG. 13, although it is understood that the irrigation pipes could be fitted around the outside of the tubular fitting member 202, by redesigning the location of the annular recesses 216, 218, 228, and 230.

The tubular fitting member 202 preferably includes a laterally facing orifice, such as a sprinkler riser orifice 204. The sprinkler riser orifice 204 can include threads 206 for receiving a threaded end of a sprinkler riser 226. Such sprinkler risers are often equipped with a sprinkler head 225, as substantially shown in FIG. 13.

The sprinkler fitting 200 of this invention can be fabricated of a polymeric material, similar to the mechanical pipe connection 100 described above. In order to further provide support and rigidity to the sprinkler fitting 200, a series of reinforcing members 212 can be provided between the sprinkler riser orifice 204 and the tubular fitting member 202.

As shown in FIG. 10, the lower surface of the tubular fitting member preferably includes a bevelled lower surface 214 for improving stability and for permitting the sprinkler fitting 200 to be slid along a field. In the preferred embodiment shown FIG. 9, the bevelled lower surface 214 is a thin, shell-like polymer material which is either a separate polymeric piece, or an integral part of the tubular fitting member 202. In order to provide more rigidity, and to prevent failure during use, reinforcing members 212 can also be located between the tubular fitting member 202 and the bevelled lower surface 214.

Figure 12:
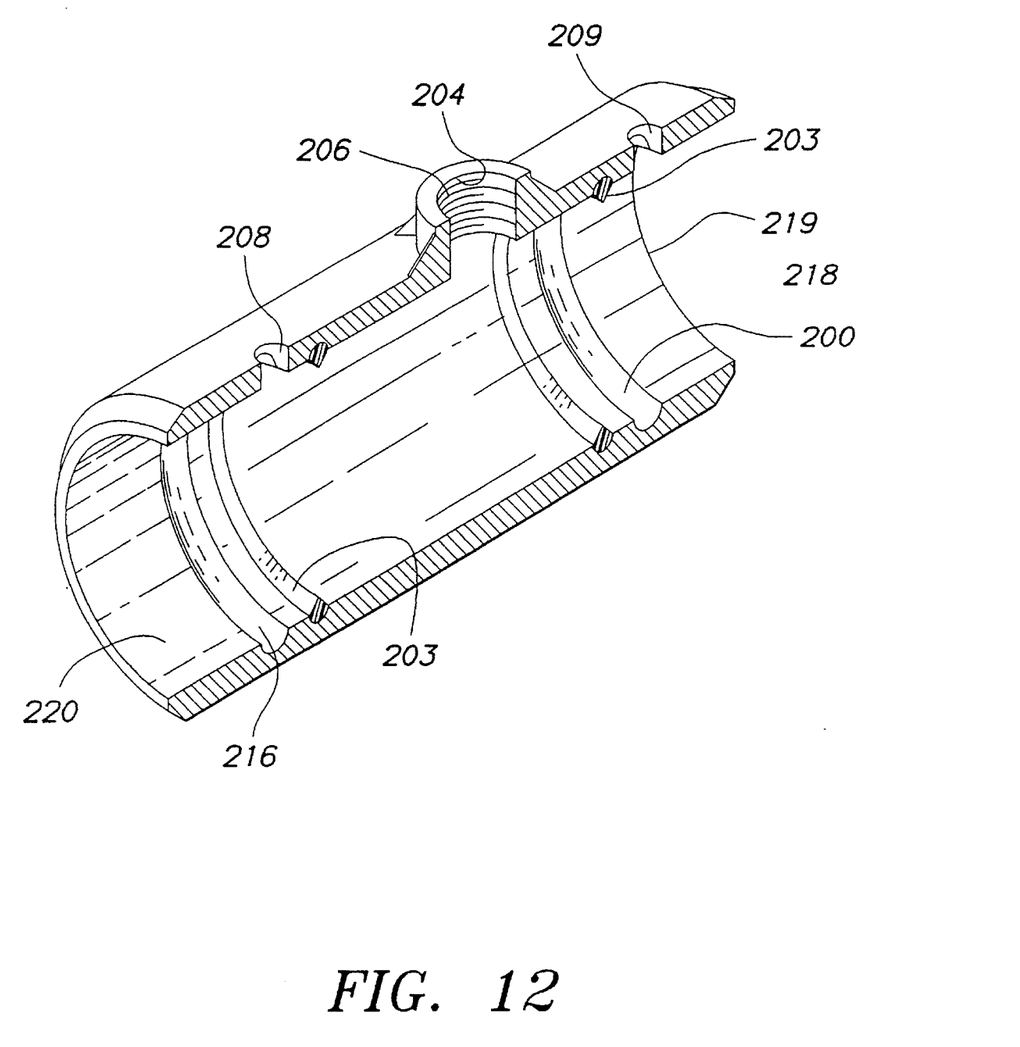
FIG. 12: is a front perspective, cross-sectional view of the sprinkler fitting of FIG. 11.
Figure 13:
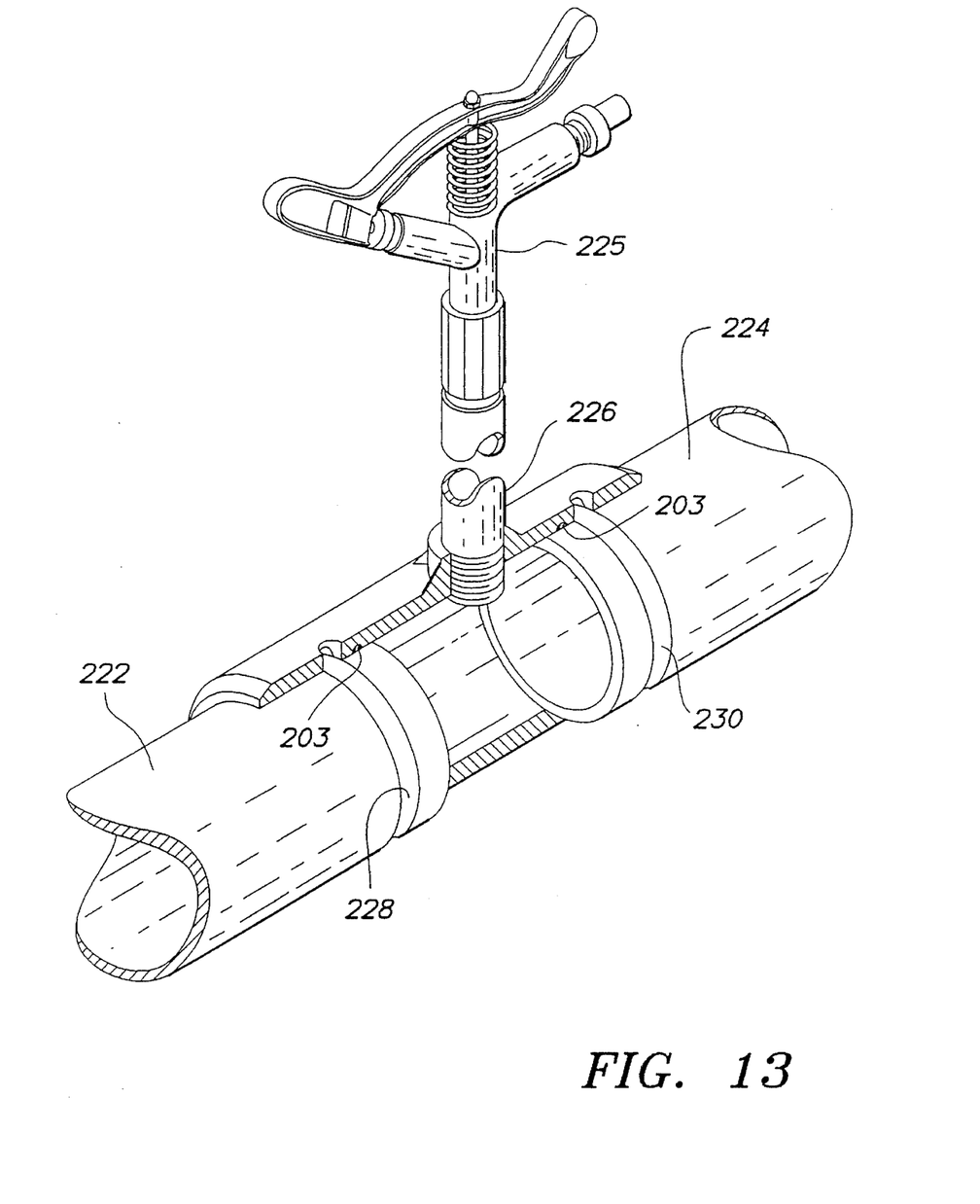
FIG. 13: is a partial perspective, cross-sectional view of the sprinkler fitting of FIG. 11 in combination with a pair of irrigation pipes and a sprinkler riser.

With reference to FIGS. 11–13, the use of the preferred sprinkler fitting 200 will now be described. During irrigation applications, this sprinkler fitting 200 receives a pair of irrigation pipes 222 and 224 into its first and second open ends 219 and 220. Once the irrigation pipes 222 and 224 are inserted sufficiently so as to approximately match the annular recesses 228 and 230 on the outer diameter of the irrigation pipes 222 and 224 with the inner annular recesses 216 and 218 of the tubular fitting member 202, one or more flexible splines 210 can be inserted. The flexible spline 210, shown in FIG. 11, can be inserted through through-hole 209 into an annular cavity formed between annular recesses 230 and 218. Another flexible spline (not shown) can be inserted through through-hole 208 to fill in the annular cavity formed between annular recesses 228 and 216. In this way a mechanical lock can be accomplished between the irrigation pipes 222 and 224 and the tubular fitting member 202 which is convenient to reverse if the sprinkler needs to be moved or replaced.

From the foregoing, it can be realized that this invention provides improved pipe connections and procedures for mechanically joining pipes and fittings of the same or of dissimilar materials. The use of a flexible polymeric spline that substantially encompasses a polymeric pipe in a carved recess uniformly distributes any axial loads created by the contents of the pipe so that stress fractures can be substantially eliminated. Additionally, the compressive strength of the spline can be engineered to create any degree of restraint up to the modulus of the polymeric pipe. The sprinkler fittings of this invention are unique in property (manufactured of lightweight polymeric material) and allow the opportunity to enhance the effectiveness, ease of operation and safety of overhead sprinkler irrigation and ultimately nutrition of cultivated crops. The integrity of "solid set" sprinkler irrigation systems is assured by the locking system which allows expansion and contraction of the pipe joint with confidence that the coupling and overhead sprinkler will remain locked and in a fixed position respectively. Nutrients and/or pesticides introduced into irrigation water applied through the course of normal crop husbandry will not react with nor corrode the piping material.

The smooth surfaces, detachability feature, inherent strength of the material as well as the locking mechanism allow for mechanization for installation, removal and transport. In certain embodiments of this invention, the gasket of this coupling preferably does not drain, therefore water is conserved inside the piping between subsequent irrigations. This allows for smooth, efficient, immediate start up of sprinkler irrigation as opposed to the fill period requirement of other systems and initial inefficient low pressure sprinkler discharge. The "non-drain" "non leak" characteristic of this embodiment eliminates the standing water problem characteristic in aluminum sprinkler lines which is an environment for growth of bacterial and fungal diseases which invade cultivated crops. The "non-drain", "non leak" characteristic of this embodiment and the added weight of the water which remains in the piping system assures that sprinkler and riser attachments remain in an upright fixed position. The combined features and operational characteristics allows the user the opportunity and confidence to automate a portable system. The non-metallic characteristic of the system eliminates the safety hazard associated with aluminum piping and electrical sources.

Although various embodiments have been illustrated, this is for the purpose of describing, and not limiting the invention. Various modifications, which will become apparent to one skilled in the art, are within the scope of this invention described in the attached claims.

What we claim is:

1. A towable, non-conductive, mechanically locking sprinkler fitting for making a fluid connection between irrigation pipes, comprising:

a polymeric tubular fitting member having first and second open ends for mating with a pair of irrigation pipes, said tubular fitting member including a laterally extending, bevelled lower surface for permitting said fitting member to be slid across a field without tipping;

an orifice disposed generally opposite said bevelled lower surface for receiving a sprinkler riser;

said tubular fitting member having an annular recess located along its surface which corresponds with a mating annular recess on at least a first of said irrigation pipes to form an annular cavity; and a flexible polymeric spline inserted into said annular cavity to form a mechanical lock between said first pipe and said tubular fitting member, said fitting being light-weight for easy towing and non-conductive so as to avoid electrocuting a user.

2. The mechanically locking sprinkler fitting of claim 1 wherein said flexible spline comprises a solid polymer when first inserted into said annular cavity.

3. The mechanically locking sprinkler fitting of claim 1 wherein said first annular recess is disposed on an interior diameter surface of said tubular fitting member.

4. The mechanically locking sprinkler fitting of claim 1 wherein said tubular fitting member comprises a second annular recess located along an inner diameter surface at said second open end of said tubular fitting member.

5. The mechanically locking sprinkler fitting of claim 4 wherein said pair of irrigation pipes are disposed into the first and second open ends of said tubular fitting member.

6. The mechanically locking sprinkler fitting of claim 5 further comprising a second flexible spline inserted into a second annular cavity located between said tubular fitting member and a second of said irrigation pipes.

7. The mechanically locking sprinkler fitting of claim 1 wherein said tubular fitting member comprises a bevelled lower surface shell for stabilizing said fitting.

8. The mechanically locking sprinkler fitting of claim 1 further comprising a fluid gasket between said tubular fitting member and one of said irrigation pipes.

9. The mechanically locking sprinkler fitting of claim 1 further comprising a pair of irrigation pipes mechanically locked to said first and second open ends of said tubular fitting member by a pair of flexible splines inserted into a pair of annular cavities located on each end of said tubular fitting member; and said sprinkler fitting also comprising a sprinkler riser threaded into said orifice.

10. A light-weight, towable, non-conductive, mechanically locking sprinkler fitting fluidly connected between a pair of irrigation pipes, said combination comprising:

a pair of irrigation pipes having at least one free, open end, each of said open ends having an annular recess located along an exterior surface thereof;

a polymeric tubular fitting member having first and second open ends for receiving said open ends of said irrigation pipes, said tubular fitting member including a laterally extending, bevelled lower surface for permitting said fitting member to be slid across a field without tipping;

said tubular fitting member also including an orifice for receiving a sprinkler riser;

said tubular fitting member including a pair of annular recesses located along its inner surface which correspond with said annular recesses located on the exterior surfaces of said irrigation pipes to form a pair of annular cavities;

a pair of polymeric flexible splines inserted into said pair of annular cavities to form a pair of mechanical locks between said irrigation pipes and said tubular fitting member; and gasket means for providing a fluid tight seal between said irrigation pipes and said tubular fitting member.

11. The combination of claim 10 wherein said flexible splines comprise a solid polymer when first inserted into said annular cavities.

12. The combination of claim 10 wherein said irrigation pipes are metallic or polymeric.

13. The combination of claim 10 wherein said tubular fitting member comprises a reinforced polymer.

14. The combination of claim 13 wherein said reinforcement comprises a stiff reinforcing member.

15. A towable, non-conductive, mechanically locking sprinkler fitting, comprising a polymeric tubular fitting member having first and second open ends for mating with a pair of irrigation pipes, said tubular fitting member including a laterally extending, bevelled lower surface for permitting said fitting member to be slid across a field without tipping;
 a sprinkler riser orifice located between said first and second open ends of said tubular fitting member;
 said tubular fitting member having a pair of annular recesses located along the inner surface near said first and second open ends; and
 a pair of polymeric flexible splines for inserting into said annular recesses when said first and second irrigation pipes are inserted into said polymeric tubular fitting member.

16. The mechanically locking sprinkler fitting of claim 15 wherein said flexible splines comprise a polymer.

17. The mechanically locking sprinkler fitting of claim 15 wherein said sprinkler riser orifice comprises a threaded inner diameter.

18. The mechanically locking sprinkler fitting of claim 17 wherein said sprinkler riser orifice comprises a sprinkler riser disposed therein.

19. The mechanically locking sprinkler fitting of claim 15 comprising a pair of through-holes through a side wall of said tubular fitting member for insertion of said flexible splines.

* * * * *